United States Patent
Burnett

(10) Patent No.: US 6,837,213 B1
(45) Date of Patent: Jan. 4, 2005

(54) POWER BOOSTER FUEL SAVER

(76) Inventor: David T. Burnett, 149 W. 21st St., Alliance, NE (US) 69301

( * ) Notice: Subject to any disclaimer, the term of this patent is extended or adjusted under 35 U.S.C. 154(b) by 0 days.

(21) Appl. No.: 10/734,189

(22) Filed: Dec. 15, 2003

(51) Int. Cl.[7] ................................................ F02B 31/00
(52) U.S. Cl. .................................. 123/306; 123/184.21
(58) Field of Search ............................. 123/306, 184.21, 123/184.32, 184.46, 184.54, 592, 593

(56) References Cited

U.S. PATENT DOCUMENTS

| | | |
|---|---|---|
| 830,268 A | 9/1906 | Wheelock |
| 1,115,699 A | 11/1914 | Loose |
| 1,182,954 A | 5/1916 | Wolf |
| 1,345,791 A | 7/1920 | Livingstone |
| 1,396,054 A | 11/1921 | Potter |
| 1,584,046 A | 5/1926 | Smith |
| 1,868,902 A | 7/1932 | Jackson |
| 5,113,838 A * | 5/1992 | Kim ............................ 123/592 |
| 6,158,412 A * | 12/2000 | Kim ............................ 123/306 |
| 6,536,420 B1 * | 3/2003 | Cheng ........................ 123/590 |
| 6,550,446 B1 * | 4/2003 | Robley, Jr. .................. 123/306 |
| 2003/0140892 A1 * | 7/2003 | Kim ............................ 123/306 |
| 2003/0226539 A1 * | 12/2003 | Kim ............................ 123/306 |

* cited by examiner

Primary Examiner—John T. Kwon
(74) Attorney, Agent, or Firm—Richard C. Litman

(57) ABSTRACT

The power booster fuel saver is made of a cut and formed piece of stainless steel in the shape of a cylinder. The strip is provided in a length sufficient to correspond to the inner diameter of the inlet pipe to a vehicle engine or from its turbo fan outlet, or into the inlet pipe leading to the turbo fan or in the exhaust pipe from the engine. A series of square-shaped tabs are cut along one side of the strip and then bent diagonally to form a series of dog-ears. Finally, the strip is rolled into the shape of a cylinder in which the edges meet and the resulting device is inserted into the intake of a vehicle.

14 Claims, 3 Drawing Sheets

POWER BOOSTER FUEL SAVER

BACKGROUND OF THE INVENTION

1. Field of the Invention

The present invention relates to an insertable device for creating a vortex in a vehicle inlet or exhaust pipe, in order to enhance vehicle performance, e.g., to boost power and save fuel. More particularly, the vortex-creating device is made of a strip of Grade 304 or 316 stainless steel that is cut to form bent tabs and shaped into a cylinder that can be inserted permanently into a vehicle air intake or exhaust pipe.

2. Description of Related Art

The invention is directed to an insertable device in which a strip of Grade 304 or 316 stainless steel is cut and bent into a cylindrical shape that is capable of being inserted into a vehicle inlet or exhaust pipe and that improves the vehicle performance during normal operation of the vehicle by creating a rotating gaseous vortex.

U.S. Pat. No. 830,268 issued to Wheelock on Sep. 4, 1906 teaches a insertable device for improving the circulation in U.S. Pat. No. 1,115,699 issued to Loose on Nov. 3, 1914 teaches an insertable mixing device for use in an internal combustion engine.

U.S. Pat. No. 1,182,954 issued to Wolf on May 16, 1916 teaches an insertable mixing device for use with internal combustion engines.

U.S. Pat. No. 1,345,791 issued to Livingstone on Jul. 6, 1920 teaches an insertable mixing device made from a single strip of cut and formed metal.

U.S. Pat. No. 1,396,054 issued to Potter on Nov. 8, 1921 teaches an insertable mixing device for use in internal combustion engines and made from a single strip of cut and formed metal.

U.S. Pat. No. 1,584,046 issued to Smith on May 11, 1926 teaches an apparatus including an insertable mixing device.

U.S. Pat. No. 1,868,902 issued to Jackson on Jul. 26, 1932 teaches an insertable mixing device.

In all known mixing devices described above, the devices include flanges or are made from materials that have proven inferior when applied to internal combustion engines. Present-day large vehicles, like tractors, diesel trucks and diesel locomotive consume large amounts of fuel. Any savings in fuel will add up to a large amount of savings in operating cost over the lifetime of the vehicle.

Present-day large vehicles use air intake pipes that are corrugated for increased strength, or are otherwise rough along their internal surfaces. Therefore, the pattern of air or gas flow through the intake or exhaust is generally turbulent, thereby contributing to inefficient gas flow and resulting in poor fuel economy.

The inventor of the present invention has found that by designing the fuel saver device to ensure that the gas rotates through the intake or exhaust, the flow enters intake efficiently.

None of the above inventions and patents, taken either singly or in combination, is seen to describe the instant invention as claimed. Therefore, a power booster fuel saver solving the aforementioned problems would be desirable.

SUMMARY OF THE INVENTION

The present invention is directed to a power booster fuel saver in which a strip of stainless steel is cut and bent into a cylindrical shape that is capable of being inserted into a vehicle inlet or exhaust pipe and that improves the vehicle performance during normal operation of the vehicle. The types of vehicles which can benefit by this device include large tractors, diesel locomotives, outboard boat motors and lawnmowers, including both turbo-boosted and carbureted vehicles.

Accordingly, it is a principal object of the invention to provide a power booster fuel saver for use in the intake or exhaust pipes of vehicles.

It is another object of the invention to provide a power booster fuel saver which is made from a cut and formed stainless steel strip that is shaped into a cylinder.

It is a further object of the invention to provide a power booster fuel saver for use in carburetor equipped vehicles, in which the device includes a plurality of cut and diagonally bent tabs, which cause the gases to flow out of the device in a clockwise direction during use, i.e., to rotate clockwise as the gases flow downstream.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
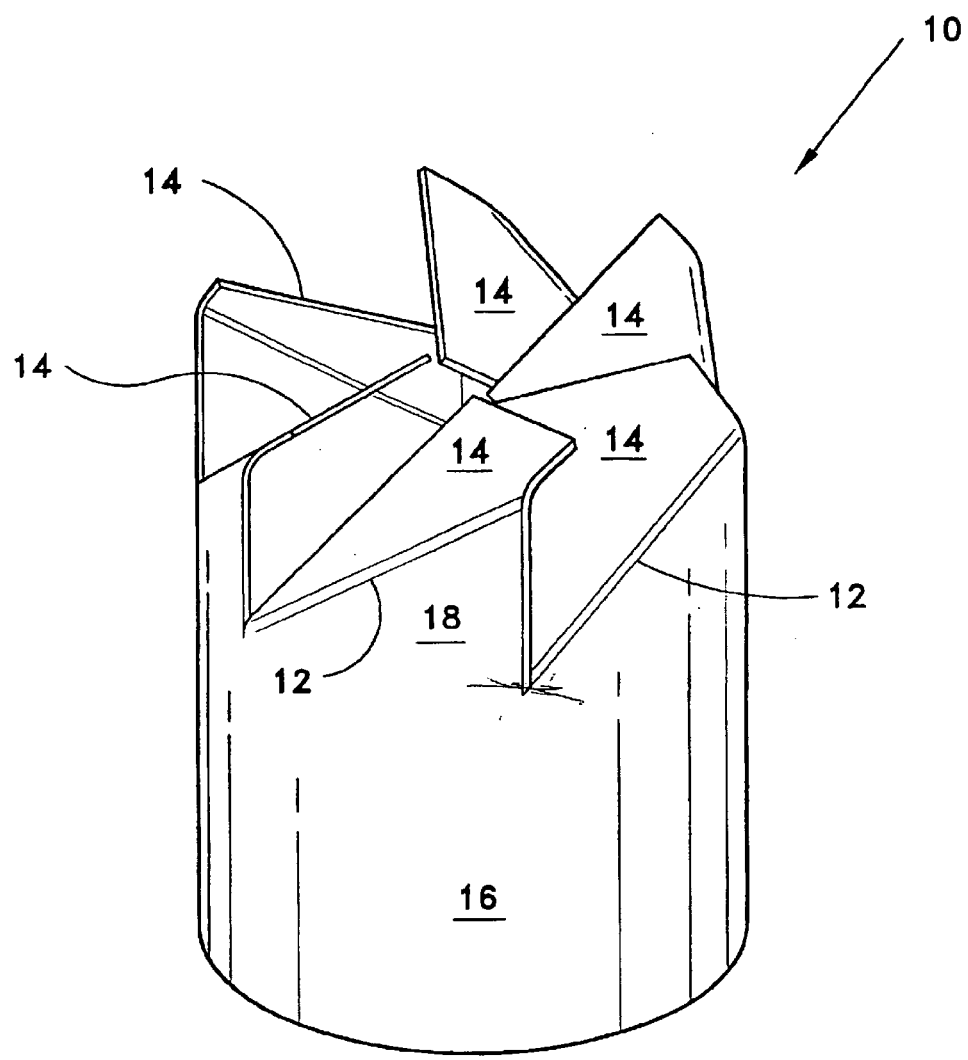
FIG. 1 is a perspective view of a power booster fuel saver according to the present invention.

FIG. 1 shows a power booster fuel saver 10 according to the present invention showing its cylindrical shape. The structure is a made from a single strip of Grade 304 or 316 stainless steel with a thickness of 25 mil for large trucks or 10 mil for other automotive vehicles. Tabs 18 extend from the remaining skirt 16 of the cylindrical structure 10. Each tab 18 is bent diagonally along folds 12 to produce dog-ears 14 that are oriented in an upward direction from the page.

Figure 2:
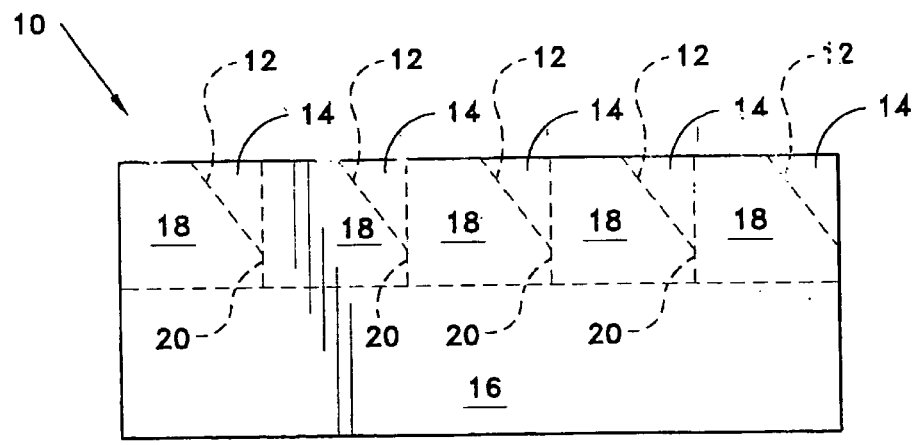
FIG. 2 is a plan view of the strip of stainless steel before cutting and forming into the power booster fuel saver of the present invention.
Figure 3:
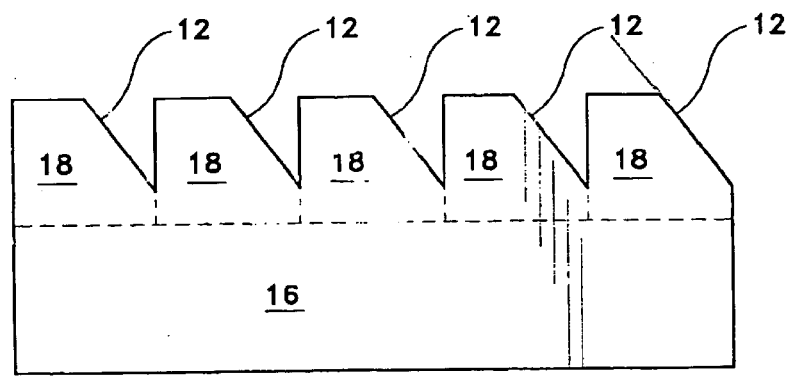
FIG. 3 is a plan view of the strip of stainless steel after cutting the tabs and bending the tabs along their diagonals, but before final shaping into a cylinder forming the power booster fuel saver according to the present invention.
Figure 4:
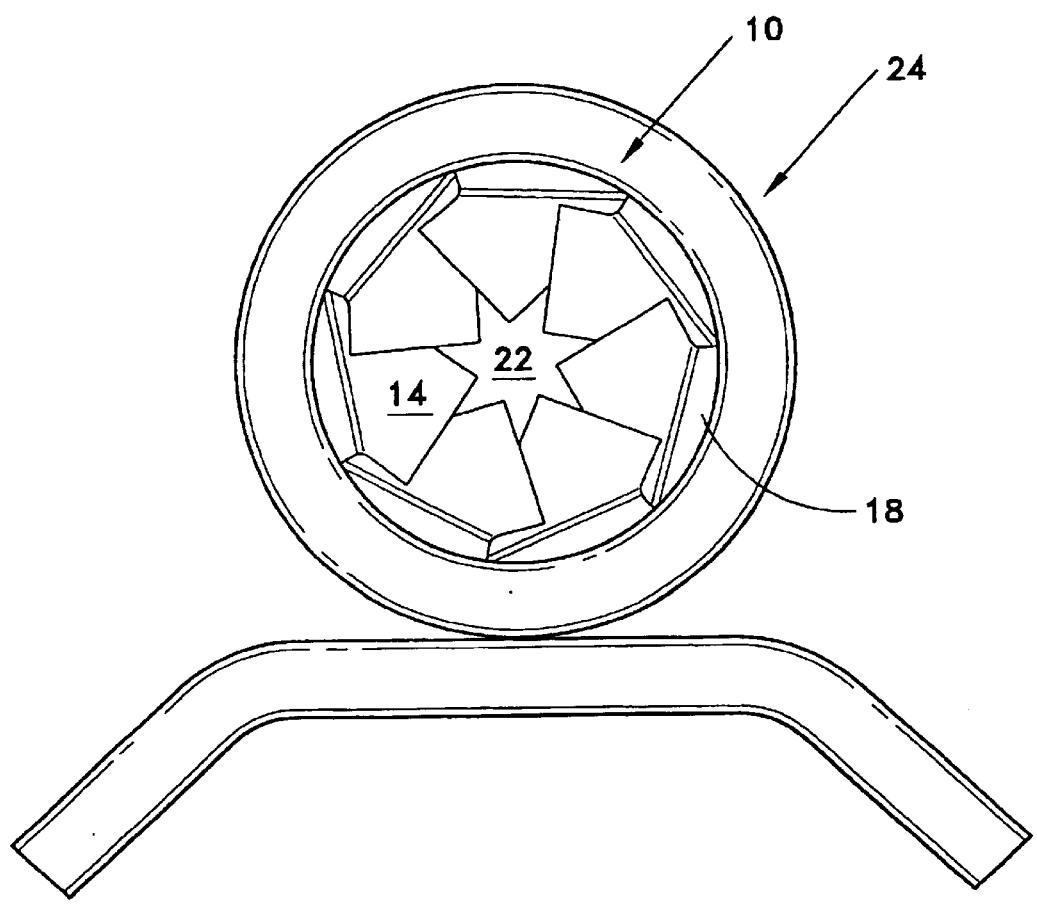
FIG. 4 is an environmental elevation view looking axially into a pipe containing the power booster fuel saver of the present invention in place.

Referring to FIG. 2, the starting strip of stainless steel, preferably grade 304 or 316, and preferably 10 mil or 25 mil in thickness, depending upon application, is initially cut along cut lines 20 to form square-shaped tabs 18 that extend from the skirt 16, as shown in FIG. 3. The strip is shaped and joined at the ends to form a cylinder, and the tabs 18 are bent radially inward in overlapping fashion to form the fuel saver 10. Grade 304 or 316 stainless steel is preferred, rather than carbon steel, so that stress fractures that may occur because of vehicle and engine vibration are avoided. The power booster fuel saver 10 can be fabricated in two possible configurations: either a clockwise or a counterclockwise vortex-producing configuration. FIG. 4 shows the power booster fuel saver 10 installed in a pipe 24 in either the intake or exhaust system.

For turbo-boosted vehicles, i.e., vehicles including turbofans in the inlet and/or the exhaust, the power booster fuel saver 10 creates a vortex that rotates in the same direction as the direction of rotation of the nearest turbo-fan. For non-turbo-boosted vehicles, the fuel saver 10 preferably creates a clockwise vortex, when viewed in the downstream direction.

In the case of a turbo-assisted vehicle, the resulting cylindrical device is placed either inside the vehicle intake line leading to the intake manifold, upstream or downstream of the turbo fan, or inside the exhaust line in an orientation that ensures that the resulting vortex rotation produced by the gases moving through the device is the same as the rotation of the nearest turbo fan. In the case of carbureted engines, the power booster fuel saver 10 causes intake air to swirl, causing better atomization of fuel in the intake manifold, thereby providing more complete combustion of the air-fuel mixture and increased fuel economy and, in the case of turbo-assisted engines, assists the turbo fan for more power through the complete range of engine speed (i.e., rpm). In the case of diesel or fuel-injected engines, placement of the device in the intake ensures improved airflow into the combustion chamber.

Some turbo-assisted vehicles are equipped with at least two turbo fans, one placed in the inlet to the engine and another in the outlet, the two axles of the turbo fans being connected directly to each other with a shaft and, in some cases, with additional intervening gears. The resulting inlet-outlet turbo fans have opposite rotations. Therefore, the correct device (i.e., clockwise or counterclockwise) to use in the inlet or outlet of these vehicles must be selected accordingly as discussed above.

The modified vehicle may also include more than one device for greater efficiency, e.g., a power booster fuel saver 10 can be installed both before and after each turbo fan for a total of 4 devices.

It is to be understood that the present invention is not limited to the sole embodiments described above, but encompasses any and all embodiments within the scope of the following claims.

I claim:

1. A fuel saver and power boosting device for use in the air intake pipe of a vehicle, comprising:

a cylindrical tube having a first and a second end; and a plurality of tabs disposed around the circumference of the first end of said tube, said tabs being bent radially toward an axial midline of said tube in an overlapping pattern;

wherein said tube is adapted for being positioned in a throttle in order to impart a swirling motion to air entering through the throttle.

2. The fuel saver and power boosting device according to claim 1, wherein said cylindrical tube is made from a single strip of stainless steel.

3. The fuel saver and power boosting device according to claim 1, wherein said cylindrical tube has a thickness of 25 mil.

4. The fuel saver and power boosting device according to claim 1, wherein said cylindrical tube has a thickness of 10 mil.

5. The fuel saver and power boosting device according to claim 1, wherein said tabs are square-shaped.

6. The fuel saver and power boosting device according to claim 1, wherein said tabs are bent radially in a clockwise direction, as viewed in the downstream direction.

7. The fuel saver and power boosting device according to claim 1, wherein said tabs are bent radially in a counterclockwise direction, as viewed in the downstream direction.

8. A fuel saver and power boosting device for use in the exhaust pipe of a vehicle, comprising:

a cylindrical tube having a first and a second end; and a plurality of tabs disposed around the circumference of the first end of said tube, said tabs being bent radially toward an axial midline of said tube in an overlapping pattern;

wherein said tube is adapted for being positioned in an exhaust body in order to impart a swirling motion to air exiting a vehicle engine.

9. The fuel saver and power boosting device according to claim 8, wherein said cylindrical tube is made from a single strip of stainless steel.

10. The fuel saver and power boosting device according to claim 8, wherein said cylindrical tube has a thickness of 25 mil.

11. The fuel saver and power boosting device according to claim 8, wherein said cylindrical tube has a thickness of 10 mil.

12. The fuel saver and power boosting device according to claim 8, wherein said tabs are square-shaped.

13. The fuel saver and power boosting device according to claim 8, wherein said tabs are bent radially in a clockwise direction, as viewed in the downstream direction.

14. The fuel saver and power boosting device according to claim 8, wherein said tabs are bent radially in a counterclockwise direction, as viewed in the downstream direction.

* * * * *